United States Patent
Kintaka

(10) Patent No.: US 7,294,597 B2
(45) Date of Patent: Nov. 13, 2007

(54) TRANSLUCENT CERAMICS, PROCESS FOR PRODUCING THE SAME, OPTICAL PART AND OPTICAL APPARATUS

(75) Inventor: Yuji Kintaka, Omihachiman (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 43 days.

(21) Appl. No.: 10/553,052

(22) PCT Filed: Mar. 9, 2005

(86) PCT No.: PCT/JP2005/004050

§ 371 (c)(1),
(2), (4) Date: Oct. 12, 2005

(87) PCT Pub. No.: WO2005/097708

PCT Pub. Date: Oct. 20, 2005

(65) Prior Publication Data

US 2006/0287187 A1    Dec. 21, 2006

(30) Foreign Application Priority Data

| Mar. 31, 2004 | (JP) | 2004-105808 |
| Mar. 31, 2004 | (JP) | 2004-105809 |
| Mar. 31, 2004 | (JP) | 2004-105810 |
| Mar. 31, 2004 | (JP) | 2004-105812 |

(51) Int. Cl.
*C04B 35/468* (2006.01)
*C04B 35/495* (2006.01)

(52) U.S. Cl. ............... 501/136; 501/135; 501/137; 501/138

(58) Field of Classification Search ........... 501/135, 501/136, 137, 138, 139
See application file for complete search history.

(56) References Cited

U.S. PATENT DOCUMENTS

| 6,403,053 B1 * | 6/2002 | Fang et al. ............... 423/594.8 |
| 6,908,872 B2 * | 6/2005 | Tanaka et al. ............. 501/135 |
| 7,056,852 B2 * | 6/2006 | Tatekawa ................ 501/135 |

FOREIGN PATENT DOCUMENTS

| CN | 1254688 A | 5/2000 |
| DE | 101 95 589 T1 | 12/2002 |
| JP | 5-127078 | 5/1993 |
| JP | 7-244865 | 9/1995 |
| JP | 2002-196167 | 7/2002 |
| JP | 2004-75512 | 3/2004 |
| JP | 2004-75516 | 3/2004 |
| JP | 2004-75517 | 3/2004 |
| WO | WO 02/49984 A1 | 6/2002 |

* cited by examiner

*Primary Examiner*—Karl Group
(74) *Attorney, Agent, or Firm*—Dickstein Shapiro LLP

(57) ABSTRACT

A translucent ceramic principally contains a composition represented by the formula $Ba\{Ti_{x1}M_{x2}(Mg_{1-t}Zn_t)_y(Ta_{1-u}Nb_u)_z\}_vO_w$, wherein M is at least one selected from the group consisting of Sn, Zr, and Hf; w is a positive number for maintaining the electrical neutrality; $x1+x2+y+z=1$; $0.015 \leq x1+x2 \leq 0.90$; $0 < x1 \leq 0.90$; $0 \leq x2 \leq 0.60$; $1.60 \leq z/y \leq 2.40$; $1.00 \leq v \leq 1.05$; $0 < t < 1$; and $0 \leq u \leq 1$. The translucent ceramic has high linear transmittance over a wide wavelength range and a large refractive index, is controllable in refractive index and Abbe number in a wide range, and is not birefringent. Therefore, lenses (2) made of the translucent ceramic are suitable for optical pickups (9) and other devices that must be small-sized and thin.

20 Claims, 2 Drawing Sheets

10

11

12

13

TRANSLUCENT CERAMICS, PROCESS FOR PRODUCING THE SAME, OPTICAL PART AND OPTICAL APPARATUS

TECHNICAL FIELD

The present invention relates to translucent ceramics suitable for optical components such as lenses, a process for producing the translucent ceramics, an optical component made of one of the translucent ceramics, and an optical device including the optical component.

BACKGROUND ART

The following materials have been used to manufacture optical components, such as lenses included in optical devices such as optical pickups, as disclosed in Patent Document 1 or Patent Document 2: glass, plastics, and monocrystalline lithium niobate ($LiNbO_3$).

Since glass and plastics have high light transmittance and can be readily processed into products having a desired shape, they are principally used to manufacture optical components such as lenses. On the other hand, since monocrystalline lithium niobate has high electro-optical properties and is birefringent, it is principally used to manufacture optical components such as optical waveguides. Small-sized and/or thin optical devices, such as optical pickups including such optical components, are demanded.

Since known types of glass and plastic have a refractive index of less than 1.9, optical components made of such materials and optical devices including such optical components have limitations in size and thickness. In particular, the known types of plastic have a disadvantage that incident light cannot be efficiently transmitted therethrough and gathered therewith because they have low humidity resistance and are birefringent.

On the other hand, monocrystalline lithium niobate has a large refractive index of, for example, 2.3. However, monocrystalline lithium niobate has a disadvantage that it is unsuitable for optical components such as lenses and has limited applications because it is birefringent.

Examples of a material which is not birefringent and which has satisfactory optical properties include translucent ceramics principally containing $Ba(Mg, Ta)O_3$ or $Ba(Zn, Ta)O_3$ perovskite. Such ceramics are disclosed in Patent Documents 3 and 4.

In the translucent ceramic disclosed in Patent Document 3, principally containing $Ba(Mg,Ta)O_3$ perovskite, the optical properties, such as the refractive index and the Abbe number thereof, can be varied by partly replacing Mg and/or Ta with Sn and/or Zr, that is, a tetravalent element. An increase in the number of replaced elements increases the changes in the properties. However, it is difficult to greatly vary the refractive index and the Abbe number of the translucent ceramic because the upper limit of the number of replaced elements is small, 0.40. The refractive index thereof can be varied in the range of, for example, 2.071 to 2.082.

In a translucent ceramic, disclosed in Patent Document 4, principally containing $Ba(Zn, Ta)O_3$ perovskite, Zn and/or Ta can be replaced with Zr; however, the upper limit of the number of replaced elements is small, 0.06. Therefore, it is difficult to greatly vary the refractive index and the Abbe number thereof. The refractive index thereof can be varied in the range of, for example, 2.128 to 2.132.

Thus, the use of the translucent ceramics to manufacture optical components leads to a decrease in the degree of freedom in designing optical devices.

In general, the linear transmittance of visible light through an optical component such as a lens is preferably independent from the wavelength. Therefore, there is a problem in that a decrease in wavelength reduces the linear transmittance of an optical component made of one of the translucent ceramics.

Patent Document 1: Japanese Unexamined Patent Application Publication No. 5-127078 (all pages and FIG. 1)

Patent Document 2: Japanese Unexamined Patent Application Publication No. 7-244865 (claim 6 and paragraph [0024])

Patent Document 3: Japanese Unexamined Patent Application Publication No. 2004-75512 (all pages and figures)

Patent Document 4: Japanese Unexamined Patent Application Publication No. 2004-75516 (all pages and figures)

DISCLOSURE OF INVENTION

Problems to be Solved by the Invention

The present invention has been made to solve the above problems. It is an object of the present invention to provide a translucent ceramic which has a large refractive index and of which the refractive index and Abbe number can be varied in a wide range and also provide a process for producing the translucent ceramic.

It is another object of the present invention to provide a translucent ceramic in which the linear transmittance of visible light is substantially independent from the wavelength and also provide a process for producing the translucent ceramic.

It is another object of the present invention to provide an optical component having small external dimensions and satisfactory optical properties and also provide an optical device including such an optical component.

Means for Solving the Problems

A translucent ceramic according to a first aspect of the present invention principally contains a composition represented by the formula $Ba\{Ti_{x1}M_{x2}(Mg_{1-t}Zn_t)_y(Ta_{1-u}Nb_u)_z\}_vO_w$, wherein M is at least one selected from the group consisting of Sn, Zr, and Hf; w is a positive number for maintaining the electrical neutrality; $x1+x2+y+z=1$; $0.015 \leq x1+x2 \leq 0.90$; $0<x1 \leq 0.90$; $0 \leq x2 \leq 0.60$; $1.60 \leq z/y \leq 2.40$; $1.00 \leq v \leq 1.05$; $0<t<1$; and $0 \leq u \leq 1$.

A translucent ceramic according to a second aspect of the present invention principally contains a composition represented by the formula $Ba\{Ti_{x1}M_{x2}Zn_y(Ta_{1-u}Nb_u)_z\}_vO_w$, wherein M is at least one selected from the group consisting of Sn, Zr, and Hf; w is a positive number for maintaining the electrical neutrality; $x1+x2+y+z=1$; $0.01 \leq x1+x2 \leq 0.60$; $0<x1 \leq 0.60$; $0 \leq x2 \leq 0.30$; $1.60 \leq z/y \leq 2.40$; $1.00 \leq v \leq 1.05$; and $0 \leq u \leq 1$.

A translucent ceramic according to a third aspect of the present invention principally contains a composition represented by the formula $Ba\{Ti_{x1}M_{x2}Zn_y(Ta_{1-u}Nb_u)_z\}_vO_w$, wherein M is at least one selected from the group consisting of Sn, Zr, and Hf; w is a positive number for maintaining the electrical neutrality; $x1+x2+y+z=1$; $0.04 \leq x1+x2 \leq 0.80$; $0<x1 \leq 0.80$; $0 \leq x2 \leq 0.40$; $1.60 \leq z/y \leq 2.40$; $1.00 \leq v \leq 1.05$; and $0 \leq u \leq 1$.

The translucent ceramics according to the present invention have a linear transmittance 20% or more, the linear transmittance being determined using visible light with a wavelength of 633 nm and a sample having a thickness of 0.4 mm.

The translucent ceramics according to the present invention have a refractive index of 1.9 or more, the linear transmittance being determined using visible light with a wavelength of 633 nm.

The translucent ceramics according to the present invention have a polycrystalline structure.

The present invention provides a process for producing any one of the translucent ceramics. The process of the present invention includes a step of preparing an unfired ceramic body, formed using a mixture of ceramic raw material powders, having a predetermined shape; a step of preparing a co-firing composition having substantially the same composition as that of the mixture of the ceramic raw material powders; and a step of firing the unfired ceramic body in an atmosphere with an oxygen content of 90% by volume or more in such a manner that the unfired ceramic body is in contact with the co-firing composition.

In the process of the present invention, the co-firing composition is powder and the firing step is performed in such a manner that the unfired ceramic body is embedded in the co-firing composition.

The present invention provides a translucent ceramic produced by the process of the present invention.

The present invention provides an optical component made of any one of the translucent ceramics and an optical device including the optical component.

ADVANTAGES

The present invention provides translucent ceramics which are not birefringent and which have a refractive index of 1.9 or more and more preferably 2.01 or more. This leads to the achievement of optical components, capable of exhibiting desired optical properties, having relatively small external dimensions.

The translucent ceramics according to the present invention are controllable in refractive index and Abbe number in a wide range. This leads to an increase in the degree of freedom in designing optical devices including optical components made of any one of the translucent ceramics according to the present invention.

The linear transmittance of the translucent ceramics according to the present invention is substantially independent from the wavelength. This leads to the achievement of highly transparent optical components.

Figure 1:
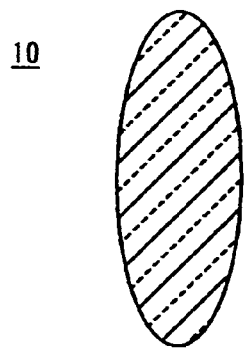
FIG. 1 is a sectional view of a biconvex lens 10 that is a first example of an optical component made of any one of translucent ceramics according to the present invention.
Figure 2:
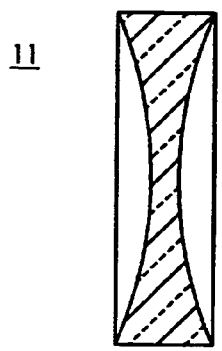
FIG. 2 is a sectional view of a biconcave lens 11 that is a second example of the optical component.
Figure 3:
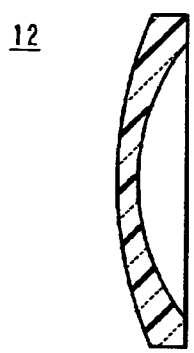
FIG. 3 is a sectional view of a meniscus lens 12 that is a third example of the optical component.
Figure 4:
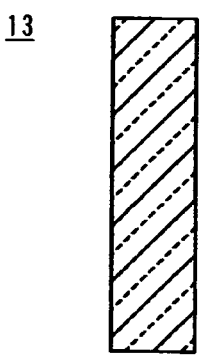
FIG. 4 is a sectional view of an optical path length adjuster 13 that is a fourth example of the optical component.
Figure 5:
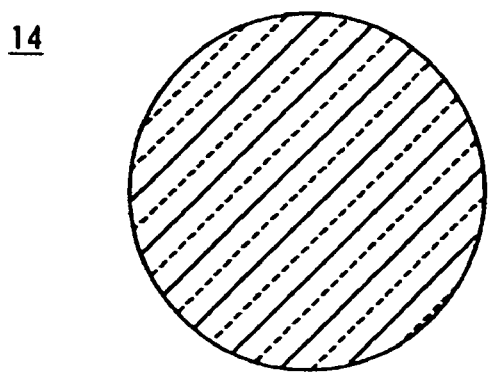
FIG. 5 is a sectional view of a spherical lens 14 that is a fifth example of the optical component.

REFERENCE NUMERALS 1 recording medium
2 objective lens
3 half mirror
4 collimator lens
5 semiconductor laser
6 condenser lens
7 photodetector
8 laser light beams
9 optical pickup
10 biconvex lens
11 biconcave lens
12 meniscus lens
13 optical path length adjuster
14 spherical lens

BEST MODE FOR CARRYING OUT THE INVENTION

Translucent ceramics according to the present invention are generally represented by the composition formula $Ba\{(Mg, Zn)(Ta, Nb)\}O_3$. The translucent ceramics contain a complex perovskite compound with a hexagonal crystal structure. Ba occupies the A sites of the perovskite structure and bivalent elements such as Mg and Zn and pentavalent elements such as Ta and Nb occupy the B sites thereof.

In the formula $Ba\{Ti_{x1}M_{x2}(Mg_{1-t}Zn_t)_y(Ta_{1-u}Nb_u)_z\}_vO_w$ described in the first aspect, the formula $Ba\{Ti_{x1}M_{x2}Zn_y(Ta_{1-u}Nb_u)_z\}_vO_w$ described in the second aspect, and the formula $Ba\{Ti_{x1}M_{x2}Mg_y(Ta_{1-u}Nb_u)_z\}_vO_w$ described in the third aspect, the molar ratio of Ta or Nb to Mg or Zn is represented by z/y and is in the range of 1.60 to 2.40 because of the perovskite structure. It is not preferable that the ratio z/y be outside the above range because the translucent ceramics would have a linear transmittance of less than 20%. The ratio of the B sites to the A sites is represented by v and is in the range of 1.00 to 1.05 because of the same reason described above. The abundance of O is represented by w and is close to 3. When the B sites of these perovskite compounds are occupied by at least one of tetravalent elements such as Ti, Sn, Zr, and Hf, these perovskite compounds have a cubic crystal structure and are translucent.

The refractive index of the translucent ceramics according to the present invention can be varied by the replacement of at least one of tetravalent elements such as Ti, Sn, Zr, and Hf. Sn is effective in reducing the refractive index thereof but Ti, Zr, and Hf are effective in enhancing the refractive index. In particular, the effect of Ti is large. The absolute value of a change in refractive index is substantially proportional to the number of replaced tetravalent elements. Therefore, in order to greatly vary the refractive index, the number of replaced tetravalent elements is preferably increased. At least one of Ti and Sn and at least one of Zr and Hf may be used in combination at an appropriate ratio, whereby the refractive index of the translucent ceramics can be freely controlled. The Abbe number, which indicates the variation in refractive index with wavelength, can be greatly varied by increasing the number of replaced tetravalent elements such as Ti, Sn, Zr, and Hf. Sn is effective in enhancing the Abbe number but Ti, Zr, and Hf are effective in reducing the Abbe number.

The composition of the translucent ceramics according to the first to third aspects of the present invention will now be separately described in detail. The translucent ceramics of the first to third aspects are different in the number of replaced tetravalent elements from each other.

The translucent ceramic of the first aspect principally contains a composition represented by the formula $Ba\{Ti_{x1}M_{x2}(Mg_{1-t}Zn_t)_y(Ta_{1-u}Nb_u)_z\}_vO_w$, wherein M is at least one selected from the group consisting of Sn, Zr, and Hf; w is a positive number for maintaining the electrical neutrality; $x1+x2+y+z=1$; $0.015 \leq x1+x2 \leq 0.90$; $0<x1 \leq 0.90$; $0 \leq x2 \leq 0.60$; $1.60 \leq z/y \leq 2.40$; $1.00 \leq v \leq 1.05$; $0<t<1$; and $0 \leq u \leq 1$.

In other simple words, the translucent ceramic of the first aspect contains both Mg and Zn which are bivalent elements. This leads to an increase in the upper limit of the number of replaced tetravalent elements, the number being represented by $x1+x2$. Furthermore, the translucent ceramic contains Ti, which is a tetravalent element. This also leads to an increase in the upper limit of $x1+x2$. In the translucent ceramic, the upper limit of $x1+x2$ is 0.90 and is greater than that of known $Ba(Mg, Ta)O_3$ ceramics. In the translucent ceramic, the refractive index can be greatly varied in the range of 2.079 to 2.362 and the Abbe number can be greatly varied in the range of 13.2 to 29.9. It is not preferable that the value of $x1+x2$ be less than 0.015, because the translucent ceramic cannot have a cubic crystal structure and the linear transmittance thereof is less than 20%. Furthermore, it is not preferable that the value of $x1+x2$ be more than 0.90, because the linear transmittance is less than 20%.

The translucent ceramic of the second aspect principally contains a composition represented by the formula $Ba\{Ti_{x1}M_{x2}Zn_y(Ta_{1-u}Nb_u)_z\}_vO_w$, wherein M is at least one selected from the group consisting of Sn, Zr, and Hf; w is a positive number for maintaining the electrical neutrality; $x1+x2+y+z=1$; $0.01 \leq x1+x2 \leq 0.60$; $0<x1 \leq 0.60$; $0 \leq x2 \leq 0.30$; $1.60 \leq z/y \leq 2.40$; $1.00 \leq v \leq 1.05$; and $0 \leq u \leq 1$.

The above $Ba\{Zn(Ta, Nb)O_3$ system contains Ti, Sn, or Hf, which is a tetravalent element. This leads to an increase in the upper limit of the number of replaced tetravalent elements, the number being represented by $x1+x2$. In particular, Ti is effective in increasing the upper limit of $x1+x2$. In this translucent ceramic, the upper limit of $x1+x2$ is 0.60 and is greater than that of known $Ba(Mg, Ta)O_3$ ceramics. In this translucent ceramic, the refractive index can be greatly varied in the range of 2.116 to 2.294 and the Abbe number can be greatly varied in the range of 15.3 to 29.3. It is not preferable that the value of $x1+x2$ be less than 0.01, because this translucent ceramic cannot have a cubic crystal structure and the linear transmittance thereof is less than 20%. Furthermore, it is not preferable that the value of $x1+x2$ be more than 0.60, because the linear transmittance is less than 20%.

The translucent ceramic of the third aspect principally contains a composition represented by the formula $Ba\{Ti_{x1}M_{x2}Mg_y(Ta_{1-u}Nb_u)_z\}_vO_w$, wherein M is at least one selected from the group consisting of Sn, Zr, and Hf; w is a positive number for maintaining the electrical neutrality; $x1+x2+y+z=1$; $0.04 \leq x1+x2 \leq 0.80$; $0<x1 \leq 0.80$; $0 \leq x2 \leq 0.40$; $1.60 \leq z/y \leq 2.40$; $1.00 \leq v \leq 1.05$; and $0 \leq u \leq 1$.

The translucent ceramic of the third aspect is of a $Ba\{Mg(Ta, Nb)O_3$ type and contains Ti, which is a tetravalent element. This leads to an increase in the upper limit of $x1+x2$. The upper limit of $x1+x2$ is 0.80. The refractive index can be varied in the range of 2.080 to 2.307 and the Abbe number can be varied in the range of 18.2 to 29.8. It is not preferable that the value of $x1+x2$ be less than 0.04, because this translucent ceramic cannot have a cubic crystal structure and the linear transmittance is less than 20%. Furthermore, it is not preferable that the value of $x1+x2$ be more than 0.80, because the linear transmittance is less than 20%.

As described above, the translucent ceramics according to the first to third aspects can be more greatly varied in refractive index and Abbe number as compared to known translucent ceramics. This leads to an increase in the degree of freedom in designing optical devices.

The reason why the presence of Ti increases the upper limit of the number of replaced tetravalent elements is not clear and can be assumed to be as follows: the ion radius of Ti is less than that of Zr, Sn, and Hf and this leads to an increase in the upper limit of the number of replaced tetravalent elements (the radius of $Zr^{4+}$ is 0.072 nm, the radius of $Sn^{4+}$ is 0.069 nm, the radius of $Ti^{4+}$ is 0.061 nm, and the radius of $Hf^{4+}$ is 0.071 nm).

The translucent ceramics according to the present invention may contain unavoidable impurities within the scope of the present invention. Examples of impurities contained in source oxides or carbonates and impurities contaminating the translucent ceramics during their production steps include $SiO_2$, $Fe_2O_3$, $B_2O_3$, CaO, $Y_2O_3$, $ZrO_2$, $Al_2O_3$, SrO, $WO_3$, $Bi_2O_3$, and rare earth oxides such as $Sb_2O_5$ and $La_2O_3$.

A process for producing a translucent ceramic according to the present invention will now be described.

In order to produce the translucent ceramic, an unfired ceramic body having a predetermined shape is prepared by molding a mixture of ceramic raw material powders. A co-firing composition having the same composition as that of the mixture of the ceramic raw material powders is also prepared. The unfired ceramic body is fired in an atmosphere with an oxygen content of 90% by volume or more in such a manner that the unfired ceramic body is in contact with the co-firing composition.

In the above process, the co-firing composition is, for example, powder prepared by calcining a source material having the same composition as that of the ceramic body and then pulverizing the calcined source material. The use of the co-firing composition prevents a volatile component in the ceramic body from being vaporized during firing. Therefore, the firing step is preferably performed in such a manner that the unfired ceramic body is embedded in the powdery co-firing composition. The co-firing composition is not limited to powder and may be a molding or a sintered body.

The co-firing composition preferably has the same composition as that of the powder mixture for forming the ceramic body and may have substantially the same composition as that of the powder mixture. The close "the co-firing composition has substantially the same composition as that of the powder mixture" means that the co-firing composition and the powder mixture contains the same components and the composition of the co-firing composition is similar to that of the powder mixture and also means that the composition of the co-firing composition need not be completely the same as that of the powder mixture. The co-firing composition need not be translucent.

The firing step may be performed at a pressure less than or equal to atmospheric pressure. Therefore, a pressurizer such as a hot isostatic press (HIP) is not necessary.

The translucent ceramics according to the present invention have high linear transmittance and the linear transmittance thereof can be increased by providing an anti-reflection film (AR film) on each translucent ceramic. When, for example, a sample has a linear transmittance of 74.8% and a refractive index of 2.114, the theoretical maximum of the linear transmittance is equal to 76.0% according to Fresnel's law. In this sample, the relative transmittance is equal to 98.4% of the theoretical transmittance. This means that the sample hardly has transmittance loss. Therefore, the linear transmittance of the sample can be increased close to the theoretical transmittance by providing such an anti-reflection film on the sample.

The translucent ceramics according to the present invention can be used to make optical components such as lenses. In particular, the translucent ceramics are useful in preparing a biconvex lens 10, a biconcave lens 11, a meniscus lens 12, an optical path length adjuster 13, and a spherical lens 14 shown in FIGS. 1 to 5.

An optical device including any one of these optical components will now be described using an optical pickup as an example.

Figure 6:
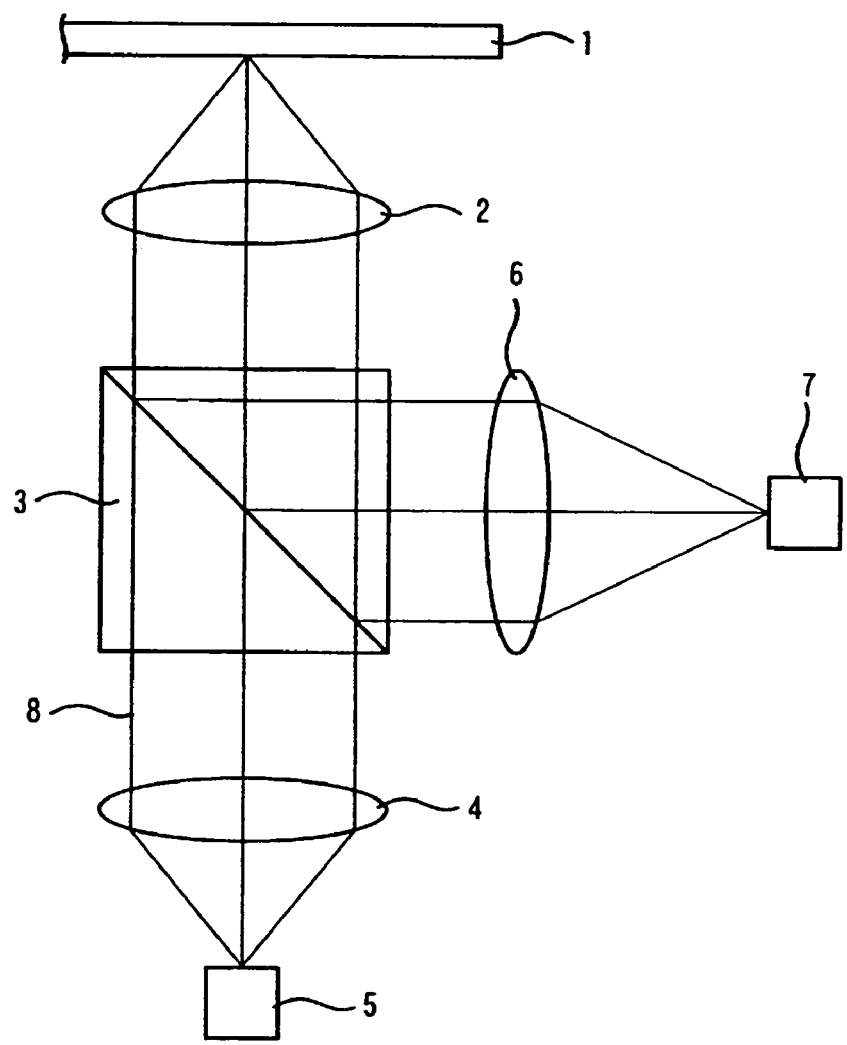
FIG. 6 is a schematic front view of an optical pickup 9 that is an example of an optical device including an optical component made of any one of the translucent ceramics according to the present invention.

FIG. 6 shows an optical pickup 9, in which coherent laser light beams 8 are applied to a recording medium 1 such as a compact disk or a mini disk and information recorded on the recording medium 1 is retrieved using light beams reflected therefrom.

The optical pickup 9 includes a collimator lens 4 for converting the laser light beams 8 emitted from a semiconductor laser 5 into parallel light beams and also includes a half mirror 3 placed in the way that the parallel light beams travel. The half mirror 3 allows light, traveling from the collimator lens 4, to pass therethrough but changes the traveling direction of light reflected from the recording medium 1 by about 90 degrees by reflection.

The optical pickup 9 further includes an objective lens 2 for focusing light traveling from the half mirror 3 on a recording face of the recording medium 1. The objective lens 2 can efficiently transmit light, reflected from the recording medium 1, to the half mirror 3. Since the phase of the reflected light incident on the half mirror 3 is shifted due to reflection, the traveling direction of the reflected light is changed.

The optical pickup 9 further includes a condenser lens 6 for condensing the reflected light of which the traveling direction has been changed. The optical pickup 9 further includes a photodetector 7, placed at a position on which the reflected light is focused, for retrieving information obtained from the reflected light.

In the optical pickup 9 having such a configuration, when the objective lens 2 is made of any one of the translucent ceramics according to the present invention, the optical pickup 9 can be reduced in size and thickness because the translucent ceramic has a large refractive index.

The translucent ceramics according to the present invention will now be described with reference to experiments.

[Experiment 1]

Experiment 1 Corresponds to the First Aspect of the Present Invention.

The following raw material powders were prepared: a $BaCO_3$ powder, a $MgCO_3$ powder, a $ZnO$ powder, a $Ta_2O_5$ powder, a $TiO_2$ powder, a $SnO_2$ powder, a $ZrO_2$ powder, and a $HfO_2$ powder, these powders having high purity. The raw material powders were weighed such that samples shown in Tables 1 and 2 were obtained, the samples being represented by the formula $Ba\{Ti_{x1}M_{x2}(Mg_{1-t}Zn_t)_y(Ta_{1-u}Nb_u)_z\}_vO_w$ wherein M is at least one selected from the group consisting of Sn, Zr, and Hf and w is a positive number for maintaining the electrical neutrality. The resulting powders were wet-mixed for 16 hours with a ball mill. The mixture was dried and then calcined at 1300° C. for three hours, whereby a calcined powder was obtained. In the calcined powder, the value of w was about 3.

TABLE 1

| Samples | x1 | Element Represented by M and Content | x2 | y | z | z/y | t | u | v |
|---|---|---|---|---|---|---|---|---|---|
| *1 | 0.010 | — | 0 | 0.336 | 0.654 | 1.95 | 0.5 | 0 | 1.025 |
| 2 | 0.015 | — | 0 | 0.334 | 0.651 | 1.95 | 0.5 | 0 | 1.025 |
| 3 | 0.200 | — | 0 | 0.271 | 0.529 | 1.95 | 0.5 | 0 | 1.015 |
| 4 | 0.400 | — | 0 | 0.203 | 0.397 | 1.95 | 0.5 | 0 | 1.005 |
| 5 | 0.600 | — | 0 | 0.136 | 0.264 | 1.95 | 0.5 | 0 | 1.005 |
| 6 | 0.800 | — | 0 | 0.068 | 0.132 | 1.95 | 0.5 | 0 | 1.005 |
| 7 | 0.900 | — | 0 | 0.034 | 0.066 | 1.95 | 0.5 | 0 | 1.005 |
| *8 | 0.920 | — | 0 | 0.027 | 0.053 | 1.95 | 0.5 | 0 | 1.005 |
| 9 | 0.010 | Sn: 0.200 | 0.200 | 0.268 | 0.522 | 1.95 | 0.5 | 0 | 1.025 |
| 10 | 0.020 | Sn: 0.200 | 0.200 | 0.264 | 0.516 | 1.95 | 0.5 | 0 | 1.025 |
| 11 | 0.050 | Sn: 0.200 | 0.200 | 0.254 | 0.496 | 1.95 | 0.5 | 0 | 1.025 |
| 12 | 0.100 | Sn: 0.200 | 0.200 | 0.237 | 0.463 | 1.95 | 0.5 | 0 | 1.025 |
| 13 | 0.200 | Sn: 0.200 | 0.200 | 0.203 | 0.397 | 1.95 | 0.5 | 0 | 1.025 |
| 14 | 0.300 | Sn: 0.300 | 0.300 | 0.136 | 0.264 | 1.95 | 0.5 | 0 | 1.005 |
| 15 | 0.400 | Sn: 0.400 | 0.400 | 0.068 | 0.132 | 1.95 | 0.5 | 0 | 1.005 |
| 16 | 0.450 | Sn: 0.450 | 0.450 | 0.034 | 0.066 | 1.95 | 0.5 | 0 | 1.005 |
| 17 | 0.300 | Sn: 0.600 | 0.600 | 0.034 | 0.066 | 1.95 | 0.5 | 0 | 1.005 |
| 18 | 0.008 | Hf: 0.007 | 0.007 | 0.334 | 0.651 | 1.95 | 0.5 | 0 | 1.025 |
| 19 | 0.100 | Hf: 0.100 | 0.100 | 0.271 | 0.529 | 1.95 | 0.5 | 0 | 1.025 |
| 20 | 0.010 | Hf: 0.200 | 0.200 | 0.268 | 0.522 | 1.95 | 0.5 | 0 | 1.025 |
| 21 | 0.020 | Hf: 0.200 | 0.200 | 0.264 | 0.516 | 1.95 | 0.5 | 0 | 1.025 |
| 22 | 0.050 | Hf: 0.200 | 0.200 | 0.254 | 0.496 | 1.95 | 0.5 | 0 | 1.025 |
| 23 | 0.200 | Hf: 0.200 | 0.200 | 0.203 | 0.397 | 1.95 | 0.5 | 0 | 1.025 |
| 24 | 0.300 | Hf: 0.300 | 0.300 | 0.136 | 0.264 | 1.95 | 0.5 | 0 | 1.005 |
| 25 | 0.450 | Hf: 0.450 | 0.450 | 0.034 | 0.066 | 1.95 | 0.5 | 0 | 1.005 |
| 26 | 0.300 | Hf: 0.600 | 0.600 | 0.034 | 0.066 | 1.95 | 0.5 | 0 | 1.005 |
| 27 | 0.100 | Zr: 0.100 | 0.100 | 0.271 | 0.529 | 1.95 | 0.5 | 0 | 1.025 |
| 28 | 0.050 | Sn: 0.100, Zr: 0.050 | 0.150 | 0.271 | 0.529 | 1.95 | 0.5 | 0 | 1.025 |
| 29 | 0.050 | Sn: 0.050, Zr: 0.050 Hf: 0.050 | 0.150 | 0.271 | 0.529 | 1.95 | 0.5 | 0 | 1.025 |
| 30 | 0.015 | — | 0 | 0.334 | 0.651 | 1.95 | 0.01 | 0 | 1.025 |
| 31 | 0.200 | — | 0 | 0.271 | 0.529 | 1.95 | 0.01 | 0 | 1.015 |

TABLE 1-continued

| Samples | x1 | Element Represented by M and Content | x2 | y | z | z/y | t | u | v |
|---|---|---|---|---|---|---|---|---|---|
| 32 | 0.600 | — | 0 | 0.136 | 0.264 | 1.95 | 0.01 | 0 | 1.005 |
| 33 | 0.900 | — | 0 | 0.034 | 0.066 | 1.95 | 0.01 | 0 | 1.005 |

TABLE 2

| Samples | x1 | Element Represented by M and Content | x2 | y | z | z/y | t | u | v |
|---|---|---|---|---|---|---|---|---|---|
| 34 | 0.015 | — | 0 | 0.334 | 0.651 | 1.95 | 0.05 | 0 | 1.025 |
| 35 | 0.200 | — | 0 | 0.271 | 0.529 | 1.95 | 0.05 | 0 | 1.015 |
| 36 | 0.600 | — | 0 | 0.136 | 0.264 | 1.95 | 0.05 | 0 | 1.005 |
| 37 | 0.900 | — | 0 | 0.034 | 0.066 | 1.95 | 0.05 | 0 | 1.005 |
| 38 | 0.015 | — | 0 | 0.334 | 0.651 | 1.95 | 0.95 | 0 | 1.025 |
| 39 | 0.200 | — | 0 | 0.271 | 0.529 | 1.95 | 0.95 | 0 | 1.015 |
| 40 | 0.600 | — | 0 | 0.136 | 0.264 | 1.95 | 0.95 | 0 | 1.005 |
| 41 | 0.900 | — | 0 | 0.034 | 0.066 | 1.95 | 0.95 | 0 | 1.005 |
| 42 | 0.015 | — | 0 | 0.334 | 0.651 | 1.95 | 0.99 | 0 | 1.025 |
| 43 | 0.200 | — | 0 | 0.271 | 0.529 | 1.95 | 0.99 | 0 | 1.015 |
| 44 | 0.600 | — | 0 | 0.136 | 0.264 | 1.95 | 0.99 | 0 | 1.005 |
| 45 | 0.900 | — | 0 | 0.034 | 0.066 | 1.95 | 0.99 | 0 | 1.005 |
| *46 | 0.010 | — | 0 | 0.336 | 0.654 | 1.95 | 0.5 | 0.5 | 1.015 |
| 47 | 0.020 | — | 0 | 0.332 | 0.648 | 1.95 | 0.5 | 0.5 | 1.015 |
| 48 | 0.080 | — | 0 | 0.312 | 0.608 | 1.95 | 0.5 | 0.5 | 1.015 |
| 49 | 0.242 | — | 0 | 0.257 | 0.501 | 1.95 | 0.5 | 0.5 | 1.015 |
| 50 | 0.400 | — | 0 | 0.203 | 0.397 | 1.95 | 0.5 | 0.5 | 1.015 |
| 51 | 0.800 | — | 0 | 0.068 | 0.132 | 1.95 | 0.5 | 0.5 | 1.015 |
| 52 | 0.161 | — | 0 | 0.284 | 0.555 | 1.95 | 0.5 | 1 | 1.015 |
| 53 | 0.161 | — | 0 | 0.284 | 0.555 | 1.95 | 0.5 | 0.5 | 1.015 |
| 54 | 0.121 | Sn: 0.121 | 0.121 | 0.257 | 0.501 | 1.95 | 0.5 | 0.5 | 1.025 |
| 55 | 0.121 | Zr: 0.121 | 0.121 | 0.257 | 0.501 | 1.95 | 0.5 | 0.5 | 1.025 |
| 56 | 0.121 | Hf: 0.121 | 0.121 | 0.257 | 0.501 | 1.95 | 0.5 | 0.5 | 1.025 |
| 57 | 0.081 | Sn: 0.081, Zr: 0.081 | 0.162 | 0.257 | 0.500 | 1.95 | 0.5 | 0.5 | 1.025 |
| 58 | 0.060 | Sn: 0.060, Zr: 0.060 Hf: 0.060 | 0.180 | 0.258 | 0.502 | 1.95 | 0.5 | 0.5 | 1.025 |
| *59 | 0.242 | — | 0 | 0.297 | 0.461 | 1.55 | 0.5 | 0.5 | 1.015 |
| 60 | 0.242 | — | 0 | 0.292 | 0.466 | 1.60 | 0.5 | 0.5 | 1.015 |
| 61 | 0.242 | — | 0 | 0.233 | 0.525 | 2.25 | 0.5 | 0.5 | 1.015 |
| 62 | 0.242 | — | 0 | 0.223 | 0.535 | 2.40 | 0.5 | 0.5 | 1.015 |
| *63 | 0.242 | — | 0 | 0.22 | 0.538 | 2.45 | 0.5 | 0.5 | 1.015 |
| *64 | 0.242 | — | 0 | 0.257 | 0.501 | 1.95 | 0.5 | 0.5 | 0.990 |
| 65 | 0.242 | — | 0 | 0.257 | 0.501 | 1.95 | 0.5 | 0.5 | 1.000 |
| 66 | 0.242 | — | 0 | 0.257 | 0.501 | 1.95 | 0.5 | 0.5 | 1.035 |
| 67 | 0.242 | — | 0 | 0.257 | 0.501 | 1.95 | 0.5 | 0.5 | 1.050 |
| *68 | 0.242 | — | 0 | 0.257 | 0.501 | 1.95 | 0.5 | 0.5 | 1.055 |

In the column "Element Represented by M and Content" shown in Table 1 or 2, the content of an element represented by M is equal to x2 and the total content of two or more elements represented by M is equal to x2.

The calcined powder was placed in a ball mill together with water and an organic binder and then wet-pulverized for 16 hours. The organic binder was ethyl cellulose.

The pulverized powder was dried and then put through a 50-mesh screen (sieve). The resulting powder was press-molded at a pressure 196 MPa, whereby a disc-shaped unfired ceramic body having a diameter of 30 mm and a thickness of 2 mm was obtained.

The unfired ceramic body was embedded in powder having the same composition as that of the mixture of the ceramic raw material powders contained therein. The resulting ceramic body was placed in a firing furnace and then heated in an air atmosphere, whereby the binder was removed from the ceramic body. Oxygen was fed to the air atmosphere while the furnace temperature was being increased, so that the content of oxygen in the atmosphere was increased to about 98% by volume when the maximum temperature reached 1625° C. The ceramic body was fired for 20 hours in such a manner that the firing temperature and the oxygen content were maintained as they were, whereby a fired body was obtained.

The fired body obtained was mirror-polished, whereby a disc-shaped translucent ceramic sample having a thickness of 0.4 mm was obtained.

The samples prepared as described above were measured for linear transmittance and refractive index using a light beam with a wavelength λ of 633 nm. A Shimadzu spectrophotometer (UV-200S) was used to determine the linear transmittance that is one of translucent properties. A Metricon prism coupler (Model 2010) was used to determine the refractive index.

Furthermore, each sample was measured for refractive index using light beams with a wavelength λ of 405, 532, or 830 nm. The relationship between wavelength and refractive index was determined in such a manner that Constants a, b, and c were calculated from the following equation using the refractive index determined for each of four wavelengths (405, 532, 633, and 830 nm):

$$n = a/\lambda^4 + b/\lambda^2 + c \qquad 1$$

wherein n represents the refractive index, ? represents the wavelength, and a, b, and c each represent a constant.

In order to determine the Abbe number ($?_d$), the refractive index was calculated for each of three wavelengths (F-line (486.13 nm), d-line (587.56 nm), and C-line (656.27 nm)) from Equation 1. The Abbe number was calculated from the following equation:

$$?_d = (n_d - 1)/(n_F - n_C) \qquad 2$$

wherein $n_d$ represents the refractive index determined using d-line, $n_F$ represents the refractive index determined using F-line, and $n_C$ represents the refractive index determined using C-line. The linear transmittance, refractive index, and Abbe number determined as described above are shown in Tables 3 and 4.

TABLE 3

| Samples | Linear Transmittance (%) (633 nm) | Refractive Index (633 nm) | Abbe Number $v_d$ |
|---|---|---|---|
| *1 | 15.2 | 2.098 | 28.2 |
| 2 | 20.8 | 2.099 | 28.1 |
| 3 | 73.4 | 2.150 | 24.1 |
| 4 | 66.7 | 2.205 | 20.5 |
| 5 | 52.3 | 2.260 | 17.5 |
| 6 | 38.2 | 2.315 | 15.0 |
| 7 | 22.1 | 2.342 | 13.9 |
| *8 | 18.8 | 2.348 | 13.7 |
| 9 | 76.0 | 2.092 | 28.7 |
| 10 | 76.2 | 2.096 | 28.3 |
| 11 | 76.3 | 2.103 | 27.8 |
| 12 | 74.8 | 2.12 | 26.3 |
| 13 | 68.8 | 2.146 | 24.4 |
| 14 | 53.0 | 2.171 | 22.6 |
| 15 | 41.0 | 2.197 | 21.0 |
| 16 | 27.2 | 2.210 | 20.2 |
| 17 | 21.2 | 2.165 | 23.0 |
| 18 | 25.0 | 2.096 | 28.3 |
| 19 | 70.5 | 2.123 | 26.1 |
| 20 | 70.5 | 2.098 | 28.1 |
| 21 | 74.2 | 2.102 | 27.8 |
| 22 | 74.8 | 2.111 | 27.1 |
| 23 | 67.9 | 2.152 | 24.0 |
| 24 | 30.8 | 2.180 | 22.0 |
| 25 | 21.8 | 2.223 | 19.4 |
| 26 | 20.0 | 2.183 | 21.8 |
| 27 | 75.2 | 2.127 | 25.8 |
| 28 | 76.0 | 2.108 | 27.4 |
| 29 | 75.7 | 2.109 | 27.2 |
| 30 | 21.2 | 2.079 | 29.9 |
| 31 | 72.8 | 2.130 | 25.6 |
| 32 | 51.9 | 2.240 | 18.5 |
| 33 | 21.8 | 2.322 | 14.7 |

TABLE 4

| Samples | Linear Transmittance (%) (633 nm) | Refractive Index (633 nm) | Abbe Number $v_d$ |
|---|---|---|---|
| 34 | 20.9 | 2.081 | 29.7 |
| 35 | 73.1 | 2.132 | 25.4 |
| 36 | 52.0 | 2.242 | 18.4 |
| 37 | 20.8 | 2.324 | 14.6 |
| 38 | 21.0 | 2.117 | 26.6 |
| 39 | 73.2 | 2.168 | 22.8 |
| 40 | 52.3 | 2.278 | 16.6 |
| 41 | 21.5 | 2.360 | 13.3 |
| 42 | 21.1 | 2.119 | 26.4 |
| 43 | 72.1 | 2.170 | 22.7 |
| 44 | 51.1 | 2.280 | 16.5 |
| 45 | 20.6 | 2.362 | 13.2 |
| *46 | 13.0 | 2.101 | 27.8 |

TABLE 4-continued

| Samples | Linear Transmittance (%) (633 nm) | Refractive Index (633 nm) | Abbe Number $v_d$ |
|---|---|---|---|
| 47 | 28.7 | 2.103 | 27.6 |
| 48 | 42.1 | 2.120 | 26.2 |
| 49 | 60.3 | 2.164 | 22.8 |
| 50 | 53.2 | 2.208 | 19.9 |
| 51 | 31.2 | 2.318 | 14.4 |
| 52 | 60.1 | 2.156 | 23.4 |
| 53 | 64.0 | 2.142 | 24.4 |
| 54 | 67.1 | 2.129 | 25.5 |
| 55 | 67.2 | 2.137 | 24.8 |
| 56 | 68.9 | 2.132 | 25.2 |
| 57 | 69.2 | 2.122 | 26 |
| 58 | 67.1 | 2.117 | 26.5 |
| *59 | Not sintered | — | — |
| 60 | 32.2 | 2.143 | 24.3 |
| 61 | 49.2 | 2.182 | 21.5 |
| 62 | 27.7 | 2.191 | 21.0 |
| *63 | Not sintered | — | — |
| *64 | 18.8 | 2.166 | 22.7 |
| 65 | 58.0 | 2.165 | 22.7 |
| 66 | 52.3 | 2.162 | 22.9 |
| 67 | 44.1 | 2.160 | 23.1 |
| *68 | 15.0 | 2.157 | 24.9 |

In Tables 1 to 4, the asterisked samples are outside the scope of the present invention.

With reference to Tables 1 and 2, Samples 2 to 7, 9 to 45, 47 to 58, 60 to 62, and 65 to 67 that are within the scope of the present invention satisfy the following conditions: $0.015 \leq x1+x2 \leq 0.90$, $0 < x1 \leq 0.90$, $0 \leq x2 \leq 0.60$, $1.60 \leq z/y \leq 2.40$, $1.00 \leq v \leq 1.05$, $0 < t < 1$, and $0 \leq u \leq 1$. With reference to Tables 3 and 4, these samples have a linear transmittance of 20% or more, a large refractive index of 2.01 or more, that is, a refractive index of 2.079 to 2.362, and an Abbe number of 13.2 to 29.9. The differences in refractive index and Abbe number between these samples are large.

The comparisons between Samples 2 to 7, between Samples 30 to 33, between Samples 34 to 37, between Samples 38 to 41, between Samples 42 to 45, and between Samples 47 to 51 show that an increase in Ti content increases the refractive index-but decreases the Abbe number.

The comparisons between Samples 9 to 29 and between Samples 54 to 58 show that the refractive index and the Abbe number can be freely controlled by using at least one of Ti and Sn and at least one of Zr and Hf in combination at an appropriate ratio.

On the other hand, in Samples 1 and 46 that are outside the scope of the present invention, since the value of x1+x2 is less than 0.015, the linear transmittance is less than 20%. This is because these samples cannot have a cubic crystal structure.

In Sample 8 that is outside the scope of the present invention, since the value of x1 is more than 0.90 and the value of x1+x2 is more than 0.90, the linear transmittance is less than 20%.

In Samples 59 and 63 that are outside the scope of the present invention, the value of z/y is outside the range of 1.60 to 2.40. In Samples 64 and 68 that are outside the scope of the present invention, the value of v is outside the range of 1.00 to 1.05. These samples could not be sintered in the firing step or have a linear transmittance of less than 20% even if sintered.

[Experiment 2]

Experiment 2 corresponds to the second aspect of the present invention.

The following raw material powders were prepared: a $BaCO_3$ powder, a ZnO powder, a $Ta_2O_5$ powder, a $TiO_2$ powder, a $SnO_2$ powder, a $ZrO_2$ powder, and a $HfO_2$ powder, these powders having high purity. The raw material powders were weighed such that samples shown in Table 5 were obtained, the samples being represented by the formula $Ba\{Ti_{x1}M_{x2}Zn_y(Ta_{1-u}Nb_u)_z\}_vO_w$, wherein M is at least one selected from the group consisting of Sn, Zr, and Hf and w is a positive number for maintaining the electrical neutrality. The resulting powders were wet-mixed for 16 hours with a ball mill. The mixture was dried and then calcined at 1300° C. for three hours, whereby a calcined powder was obtained. In the calcined powder, the value of w was about 3.

The calcined powder was processed by the same procedure as that described in Experiment 1, whereby a disc-shaped unfired ceramic body having a diameter of 30 mm and a thickness of 2 mm was obtained.

The unfired ceramic body was embedded in powder having the same composition as that of the mixture of the ceramic raw material powders contained therein. The resulting ceramic body was placed in a firing furnace and then heated in an air atmosphere, whereby a binder was removed from the ceramic body. Oxygen was fed to the air atmosphere while the furnace temperature was being increased, so that the content of oxygen in the atmosphere was increased to about 98% by volume when the maximum temperature reached 1600° C. The ceramic body was fired for 20 hours in such a manner that the firing temperature and the oxygen content were maintained as they were, whereby a fired body was obtained.

The fired body obtained was mirror-polished, whereby a disc-shaped translucent ceramic sample having a thickness of 0.4 mm was obtained.

The samples prepared as described above were evaluated for linear transmittance, refractive index, and Abbe number in the same manner as that described in Experiment 1. Table 6 shows the evaluation.

TABLE 5

| Samples | x1 | Element Represented by M and Content | x2 | y | z | z/y | u | v |
|---|---|---|---|---|---|---|---|---|
| *101 | 0.005 | — | 0 | 0.329 | 0.666 | 2.03 | 0 | 1.005 |
| 102 | 0.010 | — | 0 | 0.327 | 0.663 | 2.03 | 0 | 1.005 |
| 103 | 0.020 | — | 0 | 0.324 | 0.656 | 2.03 | 0 | 1.005 |
| 104 | 0.027 | — | 0 | 0.322 | 0.651 | 2.03 | 0 | 1.005 |
| 105 | 0.054 | — | 0 | 0.313 | 0.633 | 2.03 | 0 | 1.005 |
| 106 | 0.108 | — | 0 | 0.295 | 0.597 | 2.03 | 0 | 1.005 |
| 107 | 0.162 | — | 0 | 0.277 | 0.561 | 2.03 | 0 | 1.005 |
| 108 | 0.270 | — | 0 | 0.241 | 0.489 | 2.03 | 0 | 1.005 |
| 109 | 0.300 | — | 0 | 0.231 | 0.469 | 2.03 | 0 | 1.005 |
| 110 | 0.450 | — | 0 | 0.182 | 0.368 | 2.03 | 0 | 1.005 |
| 111 | 0.600 | — | 0 | 0.132 | 0.268 | 2.03 | 0 | 1.005 |
| *112 | 0.650 | — | 0 | 0.116 | 0.234 | 2.03 | 0 | 1.005 |
| 113 | 0.010 | Sn: 0.054 | 0.054 | 0.309 | 0.627 | 2.03 | 0 | 1.005 |
| 114 | 0.020 | Sn: 0.054 | 0.054 | 0.306 | 0.620 | 2.03 | 0 | 1.005 |
| 115 | 0.030 | Sn: 0.054 | 0.054 | 0.303 | 0.613 | 2.03 | 0 | 1.005 |
| 116 | 0.054 | Sn: 0.054 | 0.054 | 0.295 | 0.597 | 2.03 | 0 | 1.005 |
| 117 | 0.108 | Sn: 0.108 | 0.108 | 0.259 | 0.525 | 2.03 | 0 | 1.005 |
| 118 | 0.162 | Sn: 0.162 | 0.162 | 0.223 | 0.453 | 2.03 | 0 | 1.005 |
| 119 | 0.270 | Sn: 0.270 | 0.270 | 0.152 | 0.308 | 2.03 | 0 | 1.005 |
| 120 | 0.300 | Sn: 0.300 | 0.300 | 0.132 | 0.268 | 2.03 | 0 | 1.005 |
| 121 | 0.027 | Zr: 0.027 | 0.027 | 0.313 | 0.633 | 2.03 | 0 | 1.005 |
| 122 | 0.010 | Hf: 0.054 | 0.054 | 0.309 | 0.627 | 2.03 | 0 | 1.005 |
| 123 | 0.020 | Hf: 0.054 | 0.054 | 0.306 | 0.620 | 2.03 | 0 | 1.005 |
| 124 | 0.030 | Hf: 0.054 | 0.054 | 0.303 | 0.613 | 2.03 | 0 | 1.005 |
| 125 | 0.054 | Hf: 0.054 | 0.054 | 0.295 | 0.597 | 2.03 | 0 | 1.005 |
| 126 | 0.162 | Hf: 0.162 | 0.162 | 0.223 | 0.453 | 2.03 | 0 | 1.005 |
| 127 | 0.300 | Hf: 0.300 | 0.300 | 0.132 | 0.268 | 2.03 | 0 | 1.005 |
| 128 | 0.027 | Sn: 0.054, Zr: 0.027 | 0.081 | 0.295 | 0.597 | 2.03 | 0 | 1.005 |
| 129 | 0.027 | Sn: 0.027, Zr: 0.027 Hf: 0.027 | 0.081 | 0.295 | 0.597 | 2.03 | 0 | 1.005 |
| 130 | 0.161 | — | 0 | 0.284 | 0.555 | 1.95 | 1 | 1.015 |
| 131 | 0.161 | — | 0 | 0.284 | 0.555 | 1.95 | 0.5 | 1.015 |

The contents of the column "Element Represented by M and Content" in Table 5 are the same as those in Table 1 or 2.

TABLE 6

| Samples | Linear Transmittance (%) (633 nm) | Refractive Index (633 nm) | Abbe Number $v_d$ |
|---|---|---|---|
| *101 | 10.3 | 2.116 | 29.3 |
| 102 | 20.3 | 2.116 | 29.3 |
| 103 | 46.8 | 2.121 | 28.7 |
| 104 | 63.8 | 2.123 | 28.5 |
| 105 | 66.7 | 2.130 | 27.8 |
| 106 | 63.1 | 2.145 | 26.2 |

TABLE 6-continued

| Samples | Linear Transmittance (%) (633 nm) | Refractive Index (633 nm) | Abbe Number $\nu_d$ |
|---|---|---|---|
| 107 | 61.8 | 2.160 | 24.8 |
| 108 | 59.1 | 2.190 | 22.3 |
| 109 | 57.0 | 2.198 | 21.6 |
| 110 | 38.2 | 2.239 | 18.6 |
| 111 | 22.0 | 2.280 | 16.1 |
| *112 | 18.3 | 2.294 | 15.3 |
| 113 | 74.0 | 2.116 | 29.3 |
| 114 | 73.9 | 2.120 | 28.9 |
| 115 | 74.0 | 2.122 | 28.6 |
| 116 | 71.3 | 2.129 | 27.9 |
| 117 | 70.0 | 2.143 | 26.5 |
| 118 | 55.8 | 2.156 | 25.2 |
| 119 | 41.2 | 2.184 | 22.7 |
| 120 | 21.3 | 2.192 | 22.1 |
| 121 | 71.5 | 2.124 | 28.4 |
| 122 | 72.8 | 2.118 | 29.0 |
| 123 | 72.8 | 2.121 | 28.7 |
| 124 | 72.1 | 2.124 | 28.4 |
| 125 | 69.9 | 2.130 | 27.7 |
| 126 | 51.8 | 2.161 | 24.7 |
| 127 | 22.9 | 2.200 | 21.4 |
| 128 | 68.1 | 2.123 | 28.6 |
| 129 | 68.9 | 2.124 | 28.5 |
| 130 | 62.1 | 2.167 | 22.6 |
| 131 | 64.2 | 2.153 | 23.6 |

In Tables 5 and 6, the asterisked samples are outside scope of the present invention.

With reference to Table 5, Samples 102 to 111 and 113 to 131 that are within the scope of the present invention satisfy the following conditions: $0.01 \leq x1+x2 \leq 0.60$, $0 < x1 \leq 0.60$, $0 \leq x2 \leq 0.30$, $1.60 \leq z/y \leq 2.40$, $1.00 \leq v \leq 1.05$, and $0 \leq u \leq 1$. With reference to Table 6, these samples have a linear transmittance of 20% or more, a refractive index of 2.01 or more, that is, a refractive index of 2.116 to 2.294, and an Abbe number of 15.3 to 29.3. The differences in refractive index and Abbe number between these samples are large.

The comparisons between Samples 102 to 111 show that an increase in Ti content increases the refractive index but decreases the Abbe number.

The comparisons between Samples 113 to 129 show that the refractive index and the Abbe number can be freely controlled by using at least one of Ti and Sn and at least one of Zr and Hf in combination at an appropriate ratio.

On the other hand, in Sample 101 that is outside the scope of the present invention, since the value of $x1+x2$ is less than 0.01, the linear transmittance is less than 20%. This is because this sample cannot have a cubic crystal structure.

In Sample 112 that is outside the scope of the present invention, since the value of $x1$ is more than 0.60 and the value of $x1+x2$ is more than 0.60, the linear transmittance is less than 20%.

[Experiment 3]

Experiment 3 corresponds to the third aspect of the present invention.

The following raw material powders were prepared: a $BaCO_3$ powder, a $MgCO_3$ powder, a $Ta_2O$, powder, a $TiO_2$ powder, a $SnO_2$ powder, a $ZrO_2$ powder, and a $HfO_2$ powder, these powders having high purity. The raw material powders were weighed such that samples shown in Table 7 were obtained, the samples being represented by the formula $Ba\{Ti_{x1}M_{x2}Mg_y(Ta_{1-u}Nb_u)_z\}_vO_w$, wherein M is at least one selected from the group consisting of Sn, Zr, and Hf and w is a positive number for maintaining the electrical neutrality. The resulting powders were wet-mixed for 16 hours with a ball mill. The mixture was dried and then calcined at 1300° C. for three hours, whereby a calcined powder was obtained. In the calcined powder, the value of w was about 3.

TABLE 7

| Samples | x1 | Element Represented by M and Content | x2 | y | z | z/y | u | v |
|---|---|---|---|---|---|---|---|---|
| *201 | 0.030 | — | 0 | 0.329 | 0.641 | 1.95 | 0 | 1.025 |
| 202 | 0.040 | — | 0 | 0.325 | 0.635 | 1.95 | 0 | 1.025 |
| 203 | 0.080 | — | 0 | 0.312 | 0.608 | 1.95 | 0 | 1.025 |
| 204 | 0.161 | — | 0 | 0.284 | 0.555 | 1.95 | 0 | 1.025 |
| 205 | 0.242 | — | 0 | 0.257 | 0.501 | 1.95 | 0 | 1.025 |
| 206 | 0.322 | — | 0 | 0.230 | 0.448 | 1.95 | 0 | 1.025 |
| 207 | 0.400 | — | 0 | 0.203 | 0.397 | 1.95 | 0 | 1.025 |
| 208 | 0.500 | — | 0 | 0.169 | 0.331 | 1.95 | 0 | 1.005 |
| 209 | 0.600 | — | 0 | 0.136 | 0.264 | 1.95 | 0 | 1.005 |
| 210 | 0.700 | — | 0 | 0.102 | 0.198 | 1.95 | 0 | 1.005 |
| 211 | 0.800 | — | 0 | 0.068 | 0.132 | 1.95 | 0 | 1.005 |
| *212 | 0.850 | — | 0 | 0.051 | 0.099 | 1.95 | 0 | 1.005 |
| 213 | 0.121 | Sn: 0.121 | 0.121 | 0.257 | 0.501 | 1.95 | 0 | 1.025 |
| 214 | 0.121 | Zr: 0.121 | 0.121 | 0.257 | 0.501 | 1.95 | 0 | 1.025 |
| 215 | 0.121 | Hf: 0.121 | 0.121 | 0.257 | 0.501 | 1.95 | 0 | 1.025 |
| 216 | 0.020 | Zr: 0.020 | 0.020 | 0.325 | 0.635 | 1.95 | 0 | 1.025 |
| 217 | 0.200 | Zr: 0.200 | 0.200 | 0.203 | 0.397 | 1.95 | 0 | 1.025 |
| 218 | 0.300 | Zr: 0.300 | 0.300 | 0.136 | 0.264 | 1.95 | 0 | 1.005 |
| 219 | 0.400 | Zr: 0.400 | 0.400 | 0.068 | 0.132 | 1.95 | 0 | 1.005 |
| 220 | 0.081 | Sn: 0.081, Zr: 0.081 | 0.162 | 0.257 | 0.500 | 1.95 | 0 | 1.025 |
| 221 | 0.060 | Sn: 0.060, Zr: 0.060, Hf: 0.060 | 0.180 | 0.258 | 0.502 | 1.95 | 0 | 1.025 |
| *222 | 0.242 | — | 0 | 0.297 | 0.461 | 1.55 | 0 | 1.025 |
| 223 | 0.242 | — | 0 | 0.292 | 0.466 | 1.60 | 0 | 1.025 |
| 224 | 0.242 | — | 0 | 0.266 | 0.492 | 1.85 | 0 | 1.025 |
| 225 | 0.242 | — | 0 | 0.245 | 0.513 | 2.10 | 0 | 1.025 |
| 226 | 0.242 | — | 0 | 0.233 | 0.525 | 2.25 | 0 | 1.025 |
| 227 | 0.242 | — | 0 | 0.223 | 0.535 | 2.40 | 0 | 1.025 |
| *228 | 0.242 | — | 0 | 0.220 | 0.538 | 2.45 | 0 | 1.025 |

TABLE 7-continued

| Samples | x1 | Element Represented by M and Content | x2 | y | z | z/y | u | v |
|---|---|---|---|---|---|---|---|---|
| *229 | 0.242 | — | 0 | 0.257 | 0.501 | 1.95 | 0 | 0.990 |
| 230 | 0.242 | — | 0 | 0.257 | 0.501 | 1.95 | 0 | 1.000 |
| 231 | 0.242 | — | 0 | 0.257 | 0.501 | 1.95 | 0 | 1.010 |
| 232 | 0.242 | — | 0 | 0.257 | 0.501 | 1.95 | 0 | 1.035 |
| 233 | 0.242 | — | 0 | 0.257 | 0.501 | 1.95 | 0 | 1.050 |
| *234 | 0.242 | — | 0 | 0.257 | 0.501 | 1.95 | 0 | 1.055 |
| 235 | 0.161 | — | 0 | 0.284 | 0.555 | 1.95 | 1 | 1.015 |
| 236 | 0.161 | — | 0 | 0.284 | 0.555 | 1.95 | 0.5 | 1.015 |

The contents of the column "Element Represented by M and Content" in Table 7 are the same as those in Table 1 or 2.

The calcined powder was processed by the same procedure as that described in Experiment 1, whereby a disc-shaped unfired ceramic body having a diameter of 30 mm and a thickness of 2 mm was obtained.

The unfired ceramic body was embedded in powder having the same composition as that of the mixture of the ceramic raw material powders contained therein. The resulting ceramic body was placed in a firing furnace and then heated in an air atmosphere, whereby a binder was removed from the ceramic body. Oxygen was fed to the air atmosphere while the furnace temperature was being increased, so that the content of oxygen in the atmosphere was increased to about 98% by volume when the maximum temperature reached 1625° C. The ceramic body was fired for 20 hours in such a manner that the firing temperature and the oxygen content were maintained as they were, whereby a fired body was obtained.

The fired body obtained was mirror-polished, whereby a disc-shaped translucent ceramic sample having a thickness of 0.4 mm was obtained.

The samples prepared as described above were evaluated for linear transmittance, refractive index, and Abbe number in the same manner as that described in Experiment 1. Table 8 the evaluation.

TABLE 8

| Samples | Linear Transmittance (%) (633 nm) | Refractive Index (633 nm) | Abbe Number $v_d$ |
|---|---|---|---|
| *201 | 3.3 | 2.081 | 29.6 |
| 202 | 20.2 | 2.084 | 29.4 |
| 203 | 32.8 | 2.095 | 28.3 |
| 204 | 61.9 | 2.117 | 26.4 |
| 205 | 65.0 | 2.140 | 24.6 |
| 206 | 61.2 | 2.162 | 23.0 |
| 207 | 57.6 | 2.183 | 21.2 |
| 208 | 48.8 | 2.211 | 20.5 |
| 209 | 42.5 | 2.238 | 19.3 |
| 210 | 36.0 | 2.266 | 18.8 |
| 211 | 22.2 | 2.293 | 18.6 |
| *212 | 10.5 | 2.307 | 18.2 |
| 213 | 67.3 | 2.104 | 27.5 |
| 214 | 70.1 | 2.112 | 26.8 |
| 215 | 70.1 | 2.108 | 27.2 |
| 216 | 22.0 | 2.080 | 29.8 |
| 217 | 62.3 | 2.138 | 24.8 |
| 218 | 45.8 | 2.170 | 22.4 |
| 219 | 25.7 | 2.202 | 20.7 |
| 220 | 71.5 | 2.099 | 28.0 |
| 221 | 70.2 | 2.094 | 28.5 |
| *222 | Not sintered | — | — |
| 223 | 32.2 | 2.119 | 26.3 |

TABLE 8-continued

| Samples | Linear Transmittance (%) (633 nm) | Refractive Index (633 nm) | Abbe Number $v_d$ |
|---|---|---|---|
| 224 | 58.9 | 2.134 | 25.1 |
| 225 | 61.0 | 2.149 | 23.9 |
| 226 | 49.2 | 2.158 | 23.3 |
| 227 | 27.7 | 2.167 | 22.6 |
| *228 | Not sintered | — | — |
| *229 | 18.8 | 2.145 | 24.2 |
| 230 | 58.0 | 2.144 | 24.3 |
| 231 | 63.1 | 2.142 | 24.4 |
| 232 | 52.3 | 2.138 | 24.7 |
| 233 | 44.1 | 2.136 | 24.9 |
| *234 | 15.0 | 2.136 | 24.9 |
| 235 | 60.7 | 2.146 | 24.1 |
| 236 | 63.8 | 2.132 | 25.2 |

In Tables 7 and 8, the asterisked samples are outside the scope of the present invention.

With reference to Table 7, Samples 202 to 211, 213 to 221, 223 to 227, 230 to 233, 235, and 236 that are within the scope of the present invention satisfy the following conditions: $0.04 \leq x1+x2 \leq 0.80$, $0 < x1 \leq 0.80$, $0 \leq x2 \leq 0.40$, $1.60 \leq z/y \leq 2.40$, $1.00 \leq v \leq 1.05$, and $0 \leq u \leq 1$. With reference to Table 8, these samples have a linear transmittance of 20% or more, a large refractive index of 2.01 or more, that is, a refractive index of 2.080 to 2.307, and an Abbe number of 18.2 to 29.8. The differences in refractive index and Abbe number between these samples are large.

The comparisons between Samples 202 to 211 show that an increase in Ti content increases the refractive index but decreases the Abbe number.

The comparisons between Samples 213 to 221 show that the refractive index and the Abbe number can be freely controlled by using at least one of Ti and Sn and at least one of Zr and Hf in combination at an appropriate ratio.

On the other hand, in Sample 201 that is outside the scope of the present invention, since the value of x1+x2 is less than 0.04, the linear transmittance is less than 20%. This is because this sample cannot have a cubic crystal structure.

In Sample 212 that is outside the scope of the present invention, since the value of x1 is more than 0.80 and the value of x1+x2 is more than 0.80, the linear transmittance is less than 20%.

In Samples 222 and 228 that are outside the scope of the present invention, the value of z/y is outside the range of 1.60 to 2.40. In Samples 229 and 234 that are outside the scope of the present invention, the value of v is outside the range of 1.00 to 1.05. These samples could not be sintered in the firing step or have a linear transmittance of less than 20% even if sintered.

[Experiment 4]

Samples 3, 115, and 205 shown in Tables 1, 5, and 7, respectively, were measured for refractive index in a TE or TM mode using a light beam with a wavelength of 633 nm.

Table 9 shows the measurement.

TABLE 9

| | Refractive Index | |
|---|---|---|
| Samples | TE Mode | TM Mode |
| 3 | 2.150 | 2.150 |
| 115 | 2.122 | 2.122 |
| 205 | 2.140 | 2.140 |

Table 9 shows that the refractive index of each sample that was measured in the TE mode is equal to that of the sample that was measured in the TM mode. This means that these samples are not birefringent.

[Experiment 5]

Two inch square unfired ceramic bodies were prepared by a cast molding method in such a manner that materials each having the same composition as that of Sample 3, 115, or 205 shown in Table 1, 5, or 7, respectively were fired at 1625° C., 1600° C., or 1625° C., respectively, whereby fired bodies were obtained. A procedure for preparing Sample 3, 115, or 205 prepared by the cast molding method was substantially the same as that for preparing Sample 3, 115, or 205 obtained in Experiment 1, 2, or 3, respectively, except that Sample 3, 115, or 205 obtained in Experiment 1, 2, or 3 were prepared by the press molding method.

Samples 3, 115, and 205 prepared by the cast molding method were evaluated for linear transmittance, refractive index, and Abbe number in the same manner as that described in Experiment 1. Table 10 shows the evaluation. Table 10 also shows the linear transmittance, refractive index, and Abbe number of Samples 3, 115, and 205 obtained in Experiments 1, 2, and 3, respectively.

TABLE 10

| Samples | Molding Method | Linear Transmittance (%) (633 nm) | Refractive Index (633 nm) | Abbe Number $v_d$ |
|---|---|---|---|---|
| 3 | Press Molding | 73.4 | 2.150 | 24.1 |
| | Cast Molding | 73.8 | 2.150 | 24.1 |
| 115 | Press Molding | 74.0 | 2.122 | 28.6 |
| | Cast Molding | 74.3 | 2.122 | 28.6 |
| 205 | Press Molding | 65.0 | 2.140 | 24.6 |
| | Cast Molding | 66.2 | 2.140 | 24.6 |

As is clear from Table 10, the linear transmittance, refractive index, and Abbe number of the samples prepared by the press molding method are substantially the same as those of the samples prepared by the cast molding method. This means that the translucent ceramics according to the present invention have satisfactory properties regardless of a method for molding the translucent ceramics.

[Experiment 6]

Materials each having the same composition as that of Sample 3, 115, or 205 shown in Table 1, 5, or 7, respectively, were fired at 1650° C., 1650° C., or 1550° C., respectively, whereby fired bodies were prepared. A procedure for preparing Sample 3, 115, or 205 obtained in this experiment is substantially the same as that for preparing Sample 3, 115, or 205 obtained in Experiment 1, 2, or 3, respectively, except that the temperature of firing Sample 3, 115, or 205 obtained in this experiment was different from the temperature of firing Sample 3, 115, or 205 obtained in Experiment 1, 2, or 3, respectively.

Samples 3, 115, and 205 fired at temperatures different from those for firing the samples obtained in the former experiments were evaluated for linear transmittance, refractive index, and Abbe number in the same manner as that described in Experiment 1. Table 11 shows the evaluation. Table 11 also shows the linear transmittance, refractive index, and Abbe number of Samples 3, 115, and 205 fired at 1625° C., 1600° C., and 1625° C., respectively, as described in Experiments 1, 2, and 3, respectively.

TABLE 11

| Samples | Firing Temperature | Linear Transmittance (%) (633 nm) | Refractive Index (633 nm) | Abbe Number $v_d$ |
|---|---|---|---|---|
| 3 | 1625° C. | 73.4 | 2.091 | 28.8 |
| | 1650° C. | 73.6 | 2.091 | 28.8 |
| 115 | 1600° C. | 74.0 | 2.122 | 28.6 |
| | 1650° C. | 74.5 | 2.122 | 28.6 |
| 205 | 1625° C. | 65.0 | 2.140 | 24.6 |
| | 1550° C. | 65.8 | 2.140 | 24.6 |

As is clear from Table 11, these samples have substantially the same linear transmittance, refractive index, and Abbe number regardless of firing temperature. This means that the translucent ceramics according to the present invention may be prepared at different firing temperatures.

Although the present invention is as described above in detail with reference to the experiments, embodiments of the present invention are not limited to the experiments. The raw materials used herein are not limited to oxides nor carbonates and any materials useful in producing sintered bodies having desired properties may be used. In the above experiments, the content of oxygen in a firing atmosphere is about 98% by volume and is most suitable for experiment apparatuses used. Therefore, the oxygen content is not limited to 98% by volume. A sintered body having desired properties can be prepared if the oxygen content is maintained at 90% by volume or more.

INDUSTRIAL APPLICABILITY

The translucent ceramics according to the present invention have high linear transmittance over a wide wavelength range and a large refractive index, are controllable in refractive index and Abbe number in a wide range, and are not birefringent. Lenses made of any one of the translucent ceramics are suitable for optical pickups, digital cameras, and other devices that must be small-sized and thin.

The invention claimed is:

1. A translucent ceramic comprising a perovskite having a linear transmittance of 20% or more determined using visible light at a wavelength of 633 nm and a sample having a thickness of 0.4 mm, and a composition represented by the formula $Ba\{Ti_{x1}M_{x2}(A)_y(Ta_{1-u}Nb_u)_z\}_vO_w$, wherein A is selected from the group consisting of $(Mg_{1-t}Zn_t)$, Zn and Mg; M is at least one member selected from the group consisting of Sn, Zr, and Hf; w is a positive number for maintaining the electrical neutrality; $x1+x2+y+z=1$; $0.02 \leq x1+x2 \leq 0.90$; $0.02 \leq x1 \leq 0.90$; $0 \leq x2 \leq 0.60$; y is a positive number; $1.60 \leq z/y \leq 2.40$; $1.00 \leq v \leq 1.05$; $0 < t < 1$; and $0 \leq u \leq 1$.

2. A translucent ceramic according to claim 1 represented by the formula $Ba\{Ti_{x1}M_{x2}(Mg_{1-t}Zn_t)_y(Ta_{1-u}Nb_u)_z\}_vO_w$, wherein $0.02 \leq x1+x2 \leq 0.90$; $0.02 \leq x1 \leq 0.90$; and $0 \leq x2 \leq 0.60$.

3. A translucent ceramic according to claim 1 represented by the formula $Ba\{Ti_{x1}M_{x2}Zn_y(Ta_{1-u}Nb_u)_z\}_vO_w$, wherein $0.02 \leq x1+x2 \leq 0.60$; $0.02 \leq x1 \leq 0.60$; and $0 \leq x2 \leq 0.30$.

4. A translucent ceramic according to claim 1 represented by the formula $Ba\{Ti_{x1}M_{x2}Mg_y(Ta_{1-u}Nb_u)_z\}_vO_w$, wherein $0.04 \leq x1+x2 \leq 0.80$; $0.02 \leq x1 \leq 0.80$; and $0 \leq x2 \leq 0.40$.

5. The translucent ceramic according to claim 1, having a refractive index of 2.01 or more.

6. The translucent ceramic according to claim 1, having a polycrystalline structure.

7. The translucent ceramic according to claim 2, having a polycrystalline cubic structure, a refractive index in the range of 2.079 to 2.362 and an Abbe number in the range of 13.2 to 29.9.

8. An optical component comprising the translucent ceramic according to claim 2.

9. An optical device including the optical component according to claim 8.

10. The translucent ceramic according to claim 3, having a polycrystalline structure and a refractive index of 2.01 or more.

11. An optical component comprising the translucent ceramic according to claim 10.

12. An optical device including the optical component according to claim 11.

13. The translucent ceramic according to claim 4, having a polycrystalline structure and a refractive index of 2.01 or more.

14. An optical component comprising the translucent ceramic according to claim 13.

15. An optical device including the optical component according to claim 14.

16. A process for producing the translucent ceramic comprising a perovskite having a linear transmittance of 20% or more determined using visible light at a wavelength of 633 nm and a sample having a thickness of 0.4 mm, and a composition represented by the formula $Ba\{Ti_{x1}M_{x2}(A)_y(Ta_{1-u}Nb_u)_z\}_vO_w$, wherein A is selected from the group consisting of $(Mg_{1-t}Zn_t)$, Zn and Mg; M is at least one member selected from the group consisting of Sn, Zr, and Hf; w is a positive number for maintaining the electrical neutrality; $x1+x2+y+z=1$; $0.02 \leq x1+x2 \leq 0.90$; $0.02 \leq x1 \leq 0.90$; $0 \leq x2 \leq 0.60$; y is a positive number; $1.60 \leq z/y \leq 2.40$; $1.00 \leq v1.05$; $0<t<1$; and $0 \leq u \leq 1$, comprising:

preparing an unfired ceramic body, formed using a mixture of ceramic raw material powders, having a predetermined shape;

preparing a co-firing composition having substantially the same composition as that of the mixture of the ceramic raw material powders; and firing the unfired ceramic body in contact with the co-firing composition in an atmosphere with an oxygen content of 90% by volume or more.

17. The process according to claim 16, wherein the co-firing composition is powder and the firing step is performed in such a manner that the unfired ceramic body is embedded in the co-firing composition.

18. A translucent ceramic produced by the process according to claim 16.

19. An optical component comprising the translucent ceramic according to claim 1.

20. An optical device including the optical component according to claim 19.

* * * * *